United States Patent Office 3,705,131
Patented Dec. 5, 1972

3,705,131
POLYMERS OF POLYPHENYLENE TYPE AND
METHOD OF PRODUCING THE SAME
Vasily Vladimirovich Korshak, Mark Efimovich Volpin, Vladimir Alexandrovich Sergeev, Valentin Kuzmich Shitikov, and Igor Sergeevich Kolomnikov, Moscow, U.S.S.R., assignors to Ordena Lenina Institut Elementoorganicheskikh Soedineny Akademii nauk U.S.S.R., Moscow, U.S.S.R.
No Drawing. Filed Nov. 27, 1970, Ser. No. 93,442
Int. Cl. C08f 9/00, 23/00
U.S. Cl. 260—47 UA
8 Claims

ABSTRACT OF THE DISCLOSURE

A method of producing polymers of the crosslinked polyphenyl type by polycyclotrimerization of diethynyl derivatives of aromatic or heterocyclic compounds of the general formula $CH \equiv C-R-C \equiv CH$, where R is

[structures shown]

or of a mixture thereof with monoethynyl organic compounds of the formula $CH \equiv C_6H_5$ in the presence of complex catalysts, which are complex compounds of transition metals belonging to groups IV–VIII of the Periodic Table, such as $/(RO)_3P/_nCoHal$, where R is a lower alkyl, Hal is Cl, Br, I, and $n=3$ or 4. As a result of said method, a new type of phenylenes is obtained, conforming to the following structures:

$$\left[ -R-\left\langle\phantom{x}\right\rangle- \right]_x \text{ and } \left[ -R-\left\langle\phantom{x}\right\rangle-_{C_6H_5} \right]_x$$

where R has the above-specified significance, and $x$ is any number.

Such polymers are thermosetting, that is, when heated up to 150–200° C., they set and pass into an infusible and insoluble state; they feature a high thermostability up to 900° C., and remain invariably stable to thermal deformation up to temperatures of thermal decomposition thereof (500–600° C.).

---

The present invention relates to polymers of the crosslinked polyphenyl type and to a method of producing such polymers.

Polymers of this type feature high thermostability and heat resistance, exhibit interesting electro-physical and other properties. Therefore such polymers have been the subject of much investigation. The fields of application of polymers of this type are determined, first of all, by their extremely high thermostability (up to 900° C.). Various articles based on polyphenylenes are capable of withstanding temperatures ranging within 300–350° C. over a long period of time. This makes such polymers well applicable for developing special branches of new fields of engineering.

By now various methods have been developed for producing crosslinked polyphenyl polymers, among which the most widely known ones are oxidation dehydropolycondensation of benzene and its derivatives, condensation of dihalogeno-benzenes by following Wurtz-Fitting or Ullmann reactions, decomposition of bis-diazonium salts, dehydration of 1,3-polycyclohexadiene, etc.

The known polymers of this type are, in the main infusible at high temperatures (to about 400° C.) and do not dissolve in conventional organic solvents. This circumstance involves difficulties in the use of these polymers for producing plastic materials and articles therefrom.

The object of the present invention is to provide polymers of the crosslinked polyphenyl type fusible (at 70–300° C.) and soluble in conventional organic solvents (alcohol, acetone, toluene, benzene, etc.), and which are infusible at temperatures up to 500° C. and insoluble in conventional organic solvents, and which feature high thermostability.

Proposed herein are new crosslinked polymers of the following structures:

$$\left[ -R-\left\langle\phantom{x}\right\rangle- \right]_x \text{ and } \left[ -R-\left\langle\phantom{x}\right\rangle-_{R'} \right]_x$$

where R is

[structure]

and

[structure]

and R' is

[structure]

The values of $x$ may vary within a wide range, from 2 to 33 and over.

Said crosslinked-polymers are produced by a method which, according to the invention, is based on polycyclotrimerization of diethynyl derivatives of aromatic or heterocyclic compounds conforming to the general formula $CH \equiv C-R-C \equiv CH$, where R is

[structures]

or polycyclotrimerization of their mixtures with monoethynyl organic compounds conforming to the general formula $R'-C \equiv CH-$, where R' is

[structure]

Besides, for producing crosslinked polymers of the present invention, as starting compounds use may be made of various diethynyl compounds, including

[structures with $C \equiv CH$ groups]

$HC \equiv C-\langle\rangle-(CH_2)_n-\langle\rangle-C \equiv CH$  $n=1-20$ $HC \equiv C-\langle\rangle-S-\langle\rangle-C \equiv CH$ $HC \equiv C-\langle\rangle-Me-\langle\rangle-C \equiv CH$ where Me are metals belonging to Groups IV–VIII of the Periodic Table, and of monoethynyl compounds, including

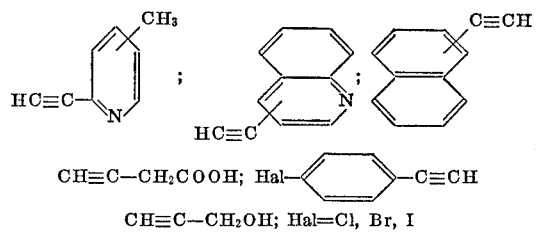

$CH\equiv C-CH_2COOH$; $Hal=Cl, Br, I$ $CH\equiv C-CH_2OH$; $Hal=Cl, Br, I$

The reaction of polycyclotrimerization of diethynyl compounds proceeds as follows:

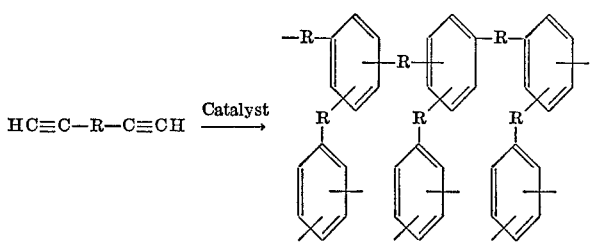

The position of the substituents in the benzene ring is usually 1,3,5- or 1,2,4-.

The polytrimerization of a mixture of a diethynyl compound and a monoethynyl compound proceeds thus:

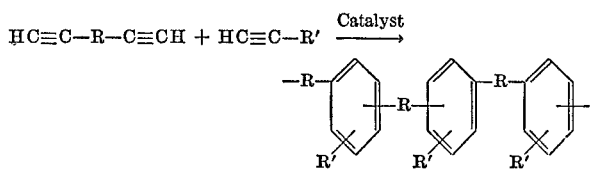

Carrying out the process of polycyclotrimerization of diethynyl compounds in the presence of monoethynyl compounds results in the formation of polyphenylenes with a smaller number of branches in the polymer chain and featuring better solubility in organic solvents.

The process of polycyclotrimerization is effected in the presence of catalysts which are compounds of transition metals belonging to Groups IV–VII of the Periodic Table. As one of effective catalysts it is possible to use a trialkyl-phosphite cobaltic complex conforming to the general formula $(RO)_3P/_{3-4}CoHal$, where R stands for lower alkyls with up to 6 carbon atoms, and Hal stands for chlorine, bromine, or iodine. Besides, such catalysts as $/(C_2H_5O_3)P/_8CO_2$, $(C_6H_5CN)_3PdBr$ may also be recommended. Such catalysts can be used in a ratio of 1 mole per 10–10,000 moles of a diethynyl derivative of an organic compound or a mixture thereof with a monoethynyl compound.

The temperature of the polycyclotrimerization reaction may be varied within a wide range, from 0 to 200° C. and higher. The polycyclotrimerization may proceed either in block, that is, without a solvent, or in a solvent.

As solvents use is made of various organic compounds boiling within the above-specified temperature range, such as aromatic compounds (benzene and its derivatives, dioxane, etc.), lower aliphatic alcohols, chlorinated hydrocarbons, and other suitable solvents. Ethanol, toluene and dioxane are preferable in this case.

In ethanol the reaction of polycyclotrimerization proceeds at a higher rate, but the solubility of the reaction products in ethanol proves to be comparatively low. For attaining a more complete conversion of the starting diethynyl and monoethynyl compounds, the reaction of polycyclotrimerization is to be carried out in organic solvents whose boiling point is higher than that of ethanol, such as toluene, dioxane or a mixture of such solvents with ethanol.

The duration of the polycyclotrimerization process may be from several minutes to several hours. This depends, first of all, on the catalyst activity, on the ratio between the catalyst and the initial ethynyl compounds, on the reaction temperature, etc. The yield of the desired products increases with the reaction being carried out over a longer period of time.

The polycyclotrimerization process is carried out in a three-necked flask equipped with a reflux condenser, a stirrer and an inlet tube for feeding an inert gas. The reaction may be also carried out in air, but air oxygen may reduce the activity of the catalytic complex and affect the reactivity of the reaction products due to intensification of oxidation processes as the reaction mass is heated. The starting ethynyl compounds, catalyst and solvent are charged into a flask of the type described. The reaction is run under heating, in a stream of an inert gas, such as nitrogen, argon, or helium. The colour of the reaction mass changes from light-yellow to dark-brown. Insoluble crosslinked polyphenyl polymers are filtered off, and soluble crosslinked polymers are re-precipitated. After drying in air at room temperature, the yield of crosslinked polyphenyl polymers is 60–100% of the theoretical amount.

An important feature of the resulting polymers is their thermosetting property; when heated to 150–200° C. and over, these polymers can pass to infusible and insoluble state. This phenomenon is, evidently, ascribable to the presence of terminal ethynyl groups, which when heated, undergo thermal polymerization with the formation of thermostable structures. The rate of setting of said polymers depends on the temperature, molecular weight, and on the content of ethynyl groups therein.

The resulting infusible and insoluble products remain invariably stable to thermal deformation up to their thermal decomposition point (500–600° C.).

The setting of said polymers under heating makes the materials based on them easily mouldable on conventional equipment when manufacturing various articles therefrom.

The properties exhibited by articles prepared from polymers produced in accordance with the present invention, when such articles are under service conditions, are essentially determined by the number of ethynyl terminal groups and by their ability to further transformations.

Such articles can be used at temperatures above 300° C.

The new method of producing polymers proposed in the present invention is based on using easily available aromatic and heterocyclic compounds, is effected at relatively low temperatures (60–200° C.), in an organic solvent or without it. This method is, in general, technologically simple, requires the use of conventional chemical equipment, and allows the obtaining of crosslinked polyphenyl polymers of a different structure with functional groups in the polymer chain.

For a better understanding of the present invention, given hereinbelow are examples illustrating the way in which the method of the invention can be realized, and specifying the properties of the desired products obtained.

EXAMPLE 1

A 250 ml. round-bottomed three-necked flask equipped with a reflux condenser, a stirrer and an inlet tube for feeding nitrogen, is charged in succession with a solution of 0.425 g. ($0.5 \cdot 10^{-3}$ mole) of triethyl phosphite cobaltic iodide complex in 20 ml. of ethanol, and a solution of 2.52 g. ($2 \cdot 10^{-2}$ mole) of diethynyl benzene in 30 ml. of ethanol. The flask is heated on a water bath till the solution starts boiling. The reaction is carried out at this temperature in a nitrogen atmosphere during 3 hours. The colour of the reaction mass changes from light-yellow at the start to greenish-yellow-brown. An hour after the commencement of the reaction a red-brown substance starts precipitating from the reaction mass, which substance is filtered off and washed on the filtre with hot ethanol. The obtained product is dried to constant weight. The yield is 1.78 g. (70.6% of the theoretical amount).

*Elementary analysis.* — Found (percent): C, 90.19, 90.02; H, 5.05, 4.96.

The crosslinked polyphenyl polymers is an amorphous product which is insoluble in conventional organic solvents and does not fuse up to 350° C.

The polymer thus obtained does not change its resistance to thermal deformation up to 500–600° C., and its loss in weight on heating in an atmosphere of argon to 900° C. over 1 hour is only 12–18%.

The IR spectra of the crosslinked polyphenyl product show the presence of trisubstituted benzene nuclei in the polymer molecule (at 810–850 cm.$^{-1}$). The molecular weight of the product separated from the mother liquor was 2600 (as determined embullioscopically in benzene).

EXAMPLE 2

A 100 ml. round-bottomed three-necked flask equipped with a stirrer, a reflux condenser and an inlet for feeding nitrogen was charged in succession with a solution of 0.51 g. (0.6·10$^{-3}$ mole) of triethyl phosphite cobaltic iodide complex in 20 ml. of ethanol, and of a mixture of 1.85 g. (0.0147 mole) of diethynyl benzene and 1.5 g. (0.0147 mole) of phenylacetylene in 30 ml. of ethanol. The reaction mass is heated almost to boiling point and kept at this temperature for 4 hours, nitrogen being continuously passed through the flask. 40 minutes after the commencement of the reaction a brown substance precipitates from the reaction mass, this precipitate being then filtered off, washed with ethanol, and dried to constant weight. The yield of the crosslinked polymer is 1.22 g. Said polymer is amorphous, insoluble in conventional organic solvents, and does not fuse up to 350° C.

EXAMPLE 3

A three-necked flask equipped with a stirrer and a reflux condenser is charged with 12.6 g. (0.1 mole) of diethynyl benzene, 10.2 g. (0.1 mole) of phenylacetylene, 1.6 g. (0.002 mole) of a catalyst/(C$_2$H$_5$O)$_3$P/$_4$CoBr and a mixture of 75 ml. of toluene with 25 ml. of absolute ethanol. The reaction is run in a stream of nitrogen at a temperature of 75–78° C. The colour of the reaction mass changed in the course of the reaction from light-yellow to dark-brown. The reaction lasts for 3 hours. The precipitate starts forming in the reaction flask 1 hour 45 minutes after the commencement of the reaction. The reaction mass is poured into acidulated water. An oily liquid which forms on the surface of the aqueous layer is transferred into a tenfold excess alcohol. A brown-coloured precipitate thus formed is filtered off, and washed on the filtre, successively, with water, hydrochloric acid, boiling hydrochloric acid, water, a 0.5 N solution of NaOH, water, and alcohol.

The resulting product is treated with dioxane. A portion of the product is dissolved in dioxane. The solution is filtered and poured into a tenfold amount of ethanol. The light-yellow product which precipitates from the ethanol solution is filtered, washed with alcohol and dried in air at room temperature. The yield of the dioxane-soluble product is 6.12 g. (26.8% of the starting products).

The specific viscosity of a 1% solution in dioxane is 0.06.

The product which is insoluble in dioxane, is washed first with hydrochloric acid, then with water, boiling hydrochloric acid, water, a 0.5 N solution of NaOH, water and alcohol. The yield of the resulting brown-coloured product is 3.8 g. (16.7 g. of the starting products).

EXAMPLE 4

A three-necked flask equipped with a stirrer and a reflux condenser is charged with 12.6 g. (0.1 mole) of diethynyl benzene, 10.2 g. (0.1 mole) of phenylacetylene and 45 ml. of absolute alcohol. After the diethynyl benzene is dissolved, a solution of 1.6 g. (0.002 mole) of a trialkyl phosphite cobaltic complex /(C$_2$H$_5$O)$_3$P/$_4$CoBr in 30 ml. of absolute alcohol is added to the reaction mass. The reaction is carried out in a stream of nitrogen at a temperature of 75–78° C. over a period of 4 hrs. 10 min. The colour of the reaction mass changes from light-yellow to dark-brown. 15 minutes after the commencement of the reaction a precipitate forms in the flask. By the end of the reaction a solid bulky product forms in the flask, which product is then washed with alcohol and comminuted in a mortar. The resulting powder is washed first with water, then with hydrochloric acid, boiling hydrochloric acid, water, a 0.5 N solution of NaOH, water, and alcohol. The thus washed product is extracted with toluene in a Soxhlet apparatus during 11 hours. The toluene-soluble product is precipitated from a tenfold amount of alcohol. The resulting yellow precipitate is filtered and washed with alcohol. The yield of the toluene-soluble product is 6.28 g. (27.5% of the amount of starting compounds). Its molecular weight is 1030 (as determined embullioscopically in chloroform). The yield of the toluene-insoluble product is 8.94 g. (39.2% of the amount of starting compounds).

EXAMPLE 5

Charged into a three-necked flask equipped with a stirrer and a reflux condenser are 12.6 g. (0.1 mole) of diethynyl benzene, 10.2 g. (0.1 mole) of phenylacetylene, 1.6 g. (0.002 mole) of a trialkyl phosphite cobaltic complex /(C$_2$H$_5$O)$_3$P/$_4$CoBr, and a mixture of 75 ml. of dioxane with 25 ml. of absolute alcohol. The reaction is carried out in a stream of nitrogen at a temperature of 75–78° C. during 4 hours. The colour of the reaction mass changes from light yellow to dark brown. A small amount of a precipitate is formed at the end of the reaction. The reaction mass is poured into acidulated water. An oily precipitate which forms is washed first with water, and then with hydrochloric acid, with boiling hydrochloric acid, with water, with a 0.5 N solution of NaOH, and with water. The resulting lumpy mass is dissolved in 200 ml. of dioxane, and this solution is poured into a tenfold amount of ethanol. The yellow precipitate which forms is filtered, washed with alcohol, and dried.

The yield of the product is 14.25 g. (62.5% of the amount of starting products).

The specific viscosity of a 1% dioxane solution is 0.16. The molecular weight, as determined embullioscopically in a chloroform solution, is 4800.

The mechanical properties of press-moulded specimens (specific pressure equal to 200 kg./cm.$^2$, temperature, 300° C.) are as follows:

specific impact strength, 1–2 kg./cm.$^2$;
specific bending strength, 500–550 kg./cm.$^2$.

After the press-moulding the specimen practically does not contain products soluble in boiling dioxane (3-hour tests).

EXAMPLE 6

A three-necked flask equipped with a stirrer and a reflux condenser is charged with 15.0 g. (0.12 mole) of diethynyl benzene, 24.47 g. (0.24 mole) of phenylacetylene, 7.2 g. (0.00897 mole) of a trialkyl phosphite cobaltic complex /(C$_2$H$_5$O)$_3$P/$_4$CoBr, and 300 ml. of absolute ethanol. The reaction mixture is heated in a stream of argon at 78° C. during 50 minutes. The resulting precipitate is filtered off and dried. The yield is 5.57 g. (14.1% of the starting compounds) (product "A").

The mother liquor after the reaction is poured into acidulated water. Then water is decanted, the residue is dissolved in alcohol at room temperature. The result is alcoholic solution "M."

The insoluble portion is dissolved in alcohol at a temperature of 70–78° C. The alcoholic solution is poured into water. 4.39 g. of a precipitate are obtained, which are again dissolved in 500 ml. of acetone and the solution is poured into 3 lit. of water. The precipitate is filtered off and dried. The weight of the residue is 4.49 g. (10.9% of the starting compounds) (product "E").

The specific viscosity of a 1% solution of product "E" in chloroform is 0.04.

Said alcoholic solution "M" is poured into water. The result is an oily residue, weighing 11.02 g. (23.4% of the starting compounds). (Product "G").

5.57 g. of product "A" are extracted with 200 g. of ethanol by refluxing over a period of 3 hours. The result is a coloured alcoholic solution "K" and an insoluble residue, which is filtered off, washed with alcohol, and dried. The weight of the residue is 3.65 g. (9.2% of the starting compounds). (Product "C").

Said "K" solution is poured into acidulated water. The precipitate is filtered off and dried. The yield is 2.1 g. (5.3% of the starting compounds). (Product "B"). The specific viscosity of a 1% solution of product "B" in chloroform is 0.04.

Said product "C" is extracted with 200 g. of toluene by refluxing. There are obtained toluene solution "L" and a residue. The weight of the residue is 2.06 g. (5.2% of the initial compounds) (Product "F").

Said "L" solution is poured into 1650 ml. of ethanol. The precipitate is filtered off and dried. The weight of the precipitate is 1.07 g. (2.7% of the starting compounds). (Product "D").

The specific viscosity of a 1% solution of product "D" in chloroform is 0.1.

Products "F," "D," "E" and "G" are amorphous. Their molecular weights, determined embullioscopically in a chloroform solution, are as follows:

product "D," 1400
product "E," 520
product "G," 340

EXAMPLE 7

A three-necked flask equipped with a stirrer and a reflux condenser is charged with 0.092 g. (0.000115 mole) of a triethyl phosphite cobaltic catalyst $$/(C_2H_5O)_3P/_4CoBr$$

dissolved in 10 ml. of absolute alcohol, and 1.00 g. (0.0046 mole) of 4,4-diethynyldiphenyloxide dissolved in 10 ml. of alcohol. The reaction mass is heated in an atmosphere of argon at a temperature of 75–78° C. during 6 hours. The precipitate formed in the reaction flask is filtered off and washed, first with hydrochloric acid, then with boiling hydrochloric acid, with water, with a 0.5 N solution of NaOH, and with alcohol. The yield of the solid product is 0.1 g. (10% of the starting compounds). 4,4-diethynyldiphenyloxide is separated from the filtrate.

EXAMPLE 8

A three-necked flask equipped with a stirrer and a reflux condenser is charged with 0.95 g. (0.0075 mole) of diethynyl benzene, 1.53 g. (0.015 mole) of phenylacetylene, 0.36 g. (0.0005 mole) of a triethyl phosphite cobaltic complex of the formula $/(C_2H_5O)_3P/_8Co_2$ in 40 ml. of absolute ethanol. The reaction is carried out in an atmosphere of argon at a temperature of 75–78° C. during 6 hours. The precipitate which forms in the reaction flask 3 hours after the commencement of the reaction is filtered off and washed first with hydrochloric acid, then with boiling hydrochloric acid, with water, with 0.5 N solution of NaOH, with water, and with alcohol. The yield of the precipitate is 0.47 g. (18.9% of the starting compounds).

EXAMPLE 9

A polycondensation test tube is charged with 0.95 g. (0.0075 mole) of diethynyl benzene and 1.53 g. (0.015 mole) of phenylacetylene. The mixture is heated to 70° C., and then 0.01 g. (0.00001 mole) of triethyl phosphite cobaltic bromide complex is added thereto. On addition of the catalyst, the reaction mass darkens. The bath temperature is raised to 90° C., and at this temperature the reaction mass is kept for 6 hours; then the temperature is raised to 120° C., and the mixture is kept at said temperature for 2 hours.

The yield of the solid reaction product is 1.74 g. (70.2% of the starting compounds). The resulting product is insoluble in conventional organic solvents.

EXAMPLE 10

A three-necked flask equipped with a stirrer, a reflux condenser and an inlet for feeding an inert gas is charged with a mixture of 90.0 g. (0.714 mole) of diethynyl benzene and 127.8 g. (2.139 moles) of phenylacetylene dissolved in 1000 ml. of toluene, and with a solution of 22.8 g. (0.0284 mole) of a trialkyl phosphite cobaltic complex $/(C_2H_5O)_3P/_4CoBr$ in 275.3 ml. of toluene. The reaction mixture is heated in a stream of argon at a temperature of 105–110° C. during 6 hours, and then it is poured into a tenfold amount of ethanol. The precipitate is filtered off and dried in air at room temperature. The yield of the product is 111.2 g. (36.08% of the total amount of the starting ethynyl compounds).

What is claimed is:

1. A method of producing polyphenyl polymers comprising polycyclotrimerization of compounds selected from the group diethynyl derivatives of aromatic compounds having the general formula $$CH \equiv C - R - C \equiv CH$$

where R is

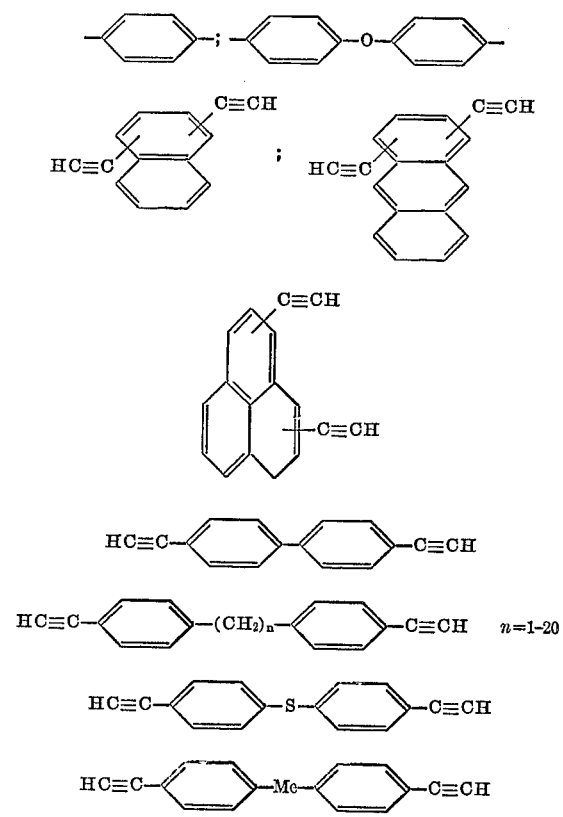

where Me are metals belonging to Groups IV–VIII of the Periodic Table, and mixtures of said diethynyl derivatives with monoethynyl compounds having the general formula $$R' - C \equiv CH$$

where R' is

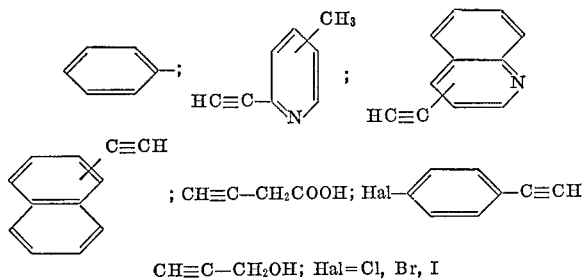

$CH{\equiv}C-CH_2OH$; Hal=Cl, Br, I in the presence of catalysts which are complex compounds of transition metals belonging to Groups IV–VIII of the Periodic Table.

2. The polyphenyl polymers produced by the method of claim 1.

3. A method according to claim 1, wherein said catalyst is $/(RO)_3P/_nCoHal$, where R is a lower alkyl comprising up to 6 carbon atoms, Hal is Br, Cl, I, and $n=3$ or 4.

4. A method according to claim 1, wherein

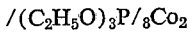

is used as a catalyst.

5. A method according to claim 1, wherein the process of polycyclotrimerization is carried out in the presence of said catalyst taken in an amount of 1 mole per 10–10,000 moles of the starting ethynyl compounds.

6. A method according to claim 1, wherein the process of polycyclotrimerization is carried out in organic solvents selected from the group consisting of aliphatic alcohols, aromatic compounds and chlorinated hydrocarbons.

7. A method according to claim 6, wherein methanol or ethanol is used as an aliphatic alcohol, and benzene, toluene, or dioxane is used as an aromatic compound.

8. A method according to claim 1, wherein the process is carried out at a temperature ranging from 0 to 200° C.

References Cited

Cherkashin et al., Izv. Ariad. Navk U.S.S.R, Ser. Kim. 1967 (II), 2450–53.

MELVIN GOLDSTEIN, Primary Examiner

U.S. Cl. X.R.

260—79.7, 80 P, 88.1 R, 88.2 C, 93.5 R

Notice of Adverse Decision in Interference

In Interference No. 98,756, involving Patent No. 3,705,131, V. V. Korshak, M. E. Volpin, V. A. Sergeev, V. K. Shitikov and I. S. Kolomnikov, POLYMERS OF POLYPHENYLENE TYPE AND METHOD OF PRODUCING THE SAME, final judgment adverse to the patentees was rendered June 16, 1977, as to claims 1, 2, 5, 6, 7 and 8.

[*Official Gazette September 20, 1977.*]